United States Patent [19]
Angeltun

[11] Patent Number: 5,662,006
[45] Date of Patent: Sep. 2, 1997

[54] BICYCLE PEDAL

[76] Inventor: Rune Angeltun, Hunsrødveien 9 A, 3233 Sandefjord, Norway

[21] Appl. No.: 196,270

[22] PCT Filed: Aug. 14, 1992

[86] PCT No.: PCT/NO92/00130

§ 371 Date: Apr. 13, 1994

§ 102(e) Date: Apr. 13, 1994

[87] PCT Pub. No.: WO93/03955

PCT Pub. Date: Mar. 4, 1993

[30] Foreign Application Priority Data

Aug. 16, 1991 [NO] Norway ................... 913224

[51] Int. Cl.⁶ .................. B62M 3/08; G05G 1/14
[52] U.S. Cl. ............... 74/594.4; 74/594.6; 36/131
[58] Field of Search ............... 74/594.4, 594.6; 36/131

[56] References Cited

U.S. PATENT DOCUMENTS

| 3,960,027 | 6/1976 | Magnuson | 74/594.6 |
| 4,685,351 | 8/1987 | Pegg | 74/594.4 |

FOREIGN PATENT DOCUMENTS

| 0 169 080 | 1/1986 | European Pat. Off. |  |
| 796362 | 4/1936 | France . | |
| 898379 | 4/1945 | France . | |
| 62 131 | 5/1802 | Germany . | |
| 31 49 345 | 6/1983 | Germany . | |
| 3304407 | 8/1984 | Germany | 74/594.6 |
| 34 45 043 | 7/1985 | Germany . | |
| 540 812 | 10/1973 | Switzerland . | |
| 485748 | 5/1938 | United Kingdom . | |
| 8804802 | 6/1988 | WIPO | 74/594.6 |

Primary Examiner—Charles A. Marmor
Assistant Examiner—Mary Ann Battista
Attorney, Agent, or Firm—Wenderoth, Lind & Ponack

[57] ABSTRACT

A bicycle pedal assembly includes a pedal axle to be fixed to a bicycle crank arm and rotated by a foot of a cyclist in a direction of drive rotation. A pedal on the pedal axle has a length to extend beneath substantially the entire foot of the cyclist. The pedal includes a portion to support the ball of the foot of the cyclist, such portion being positioned substantially directly above the pedal axle. The pedal also includes at a rear end thereof a heel attaching arrangement to achieve attachment of the rear end of the pedal to the heel of the foot of the cyclist. Mounted between the pedal and the pedal axle is a freewheel device that enables free rotating of the pedal relative to the pedal axle in a direction opposite to the direction of drive rotation, while blocking rotation of the pedal relative to the pedal axle in a direction corresponding to the direction of drive rotation. As a result, during an up pedalling phase, the freewheel device and creates a moment arm extension resulting in an increased upward pulling force during the up pedalling phase.

14 Claims, 9 Drawing Sheets

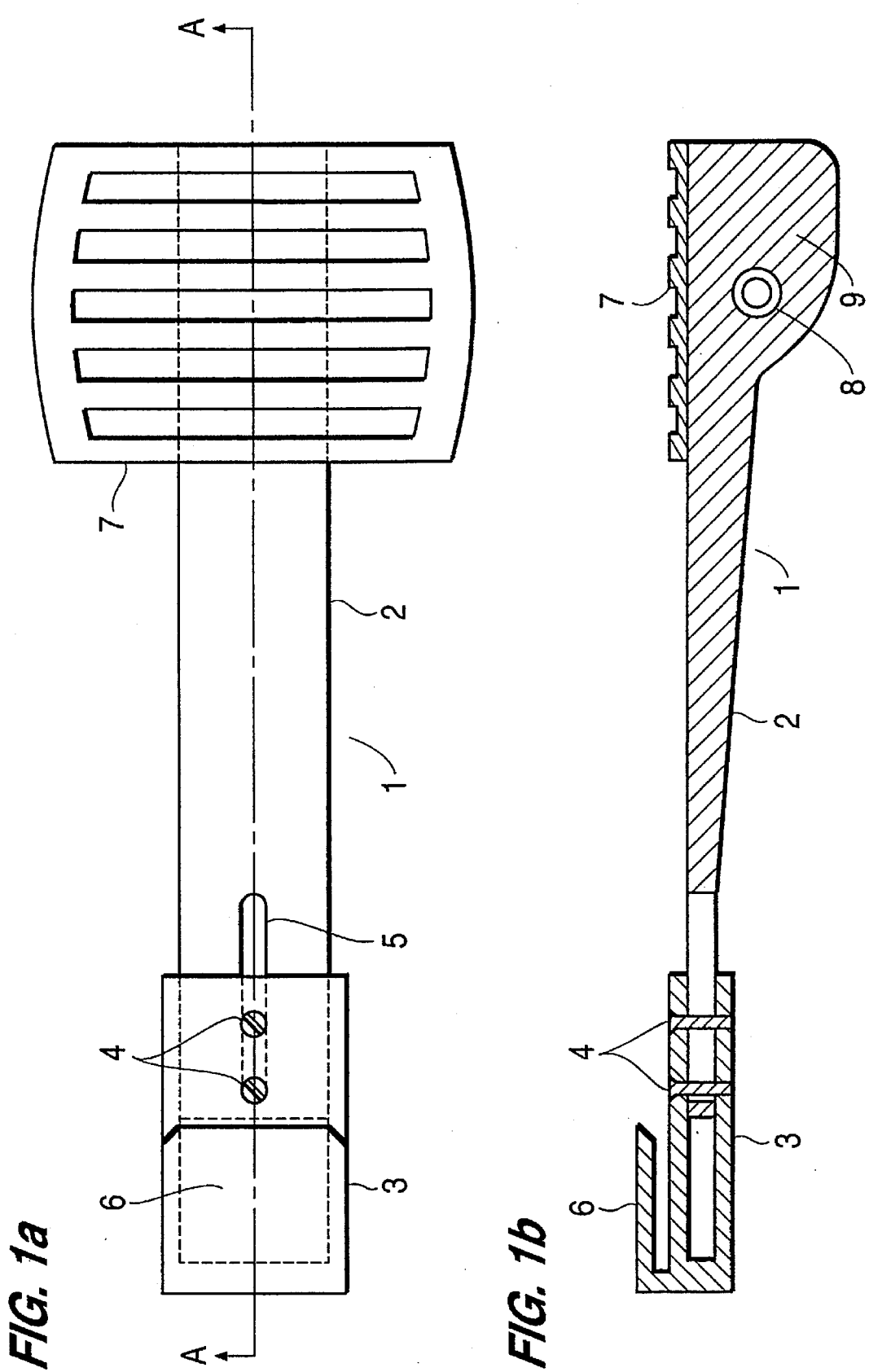

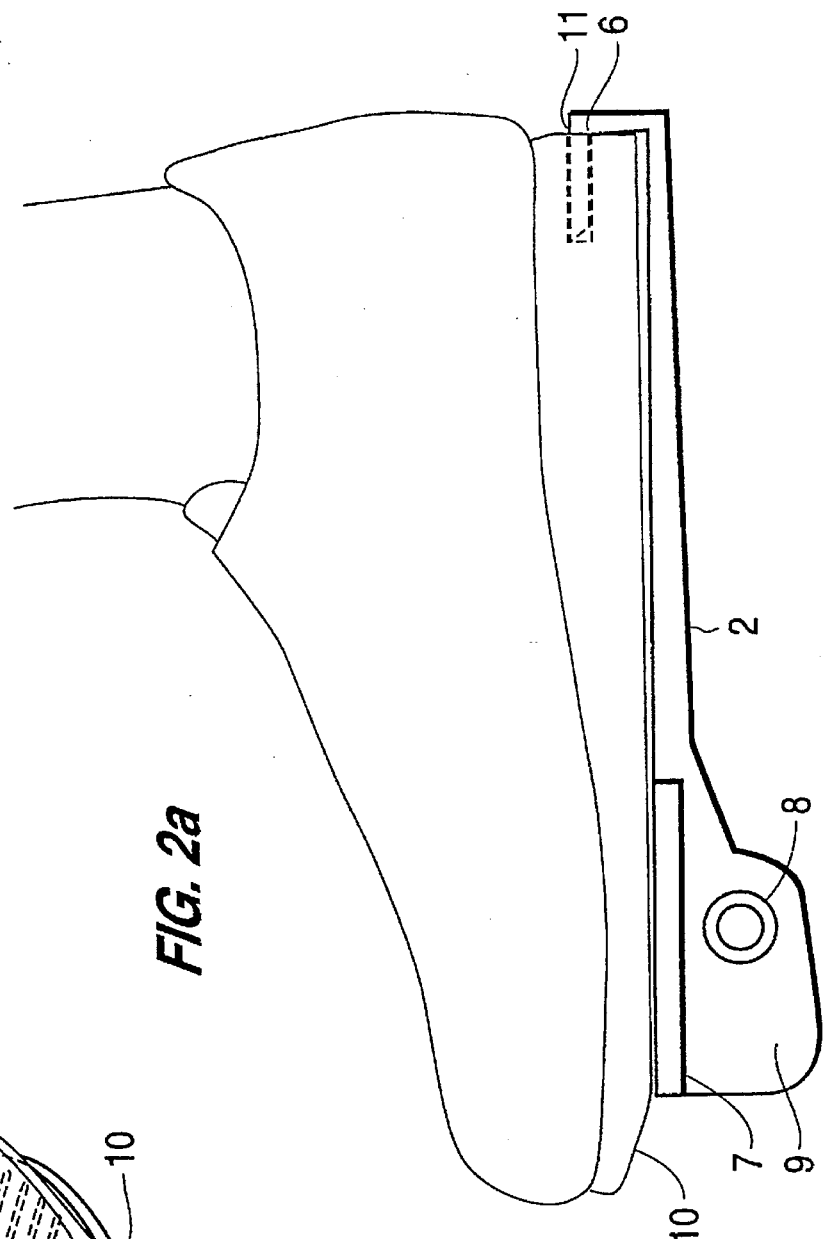

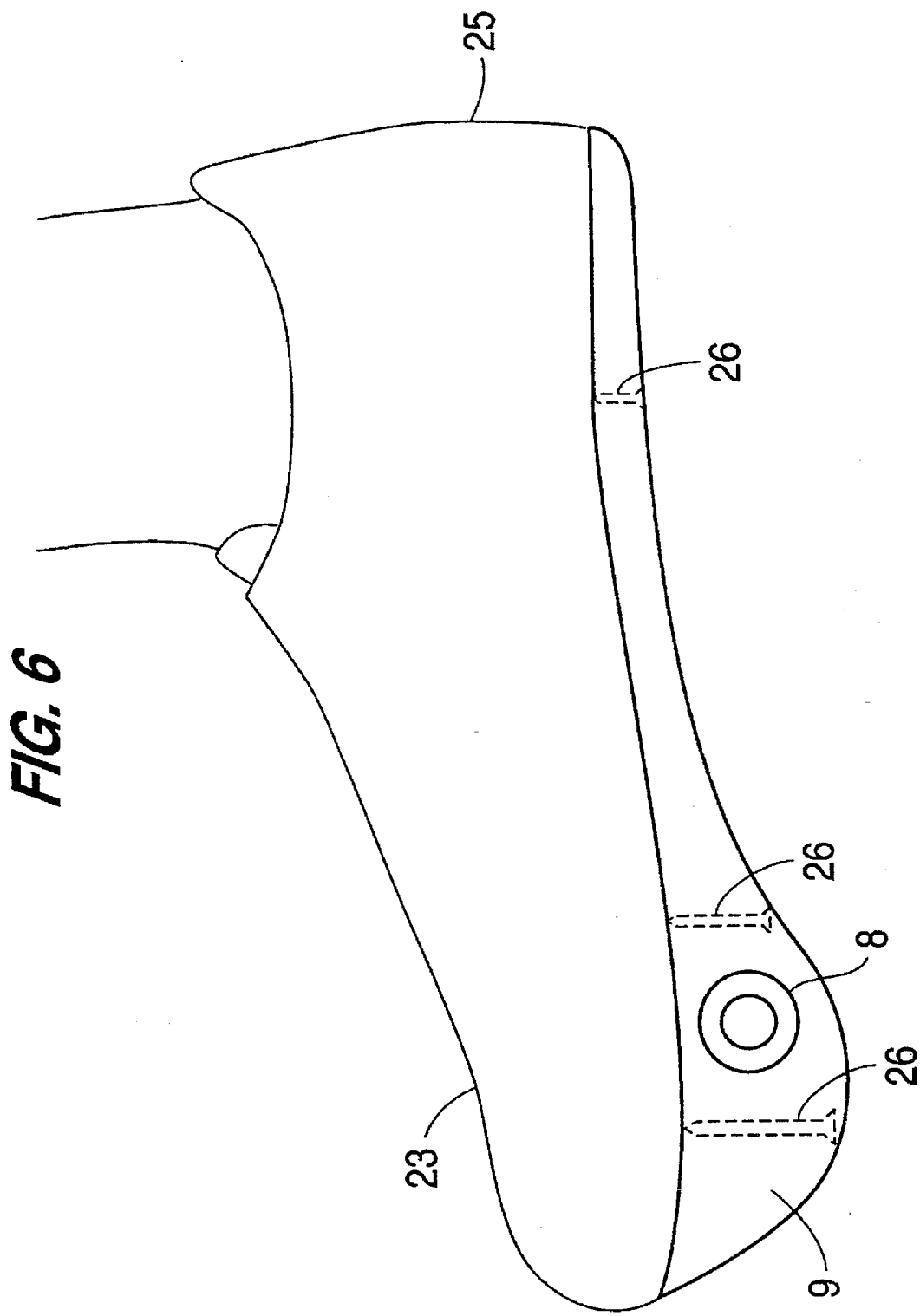

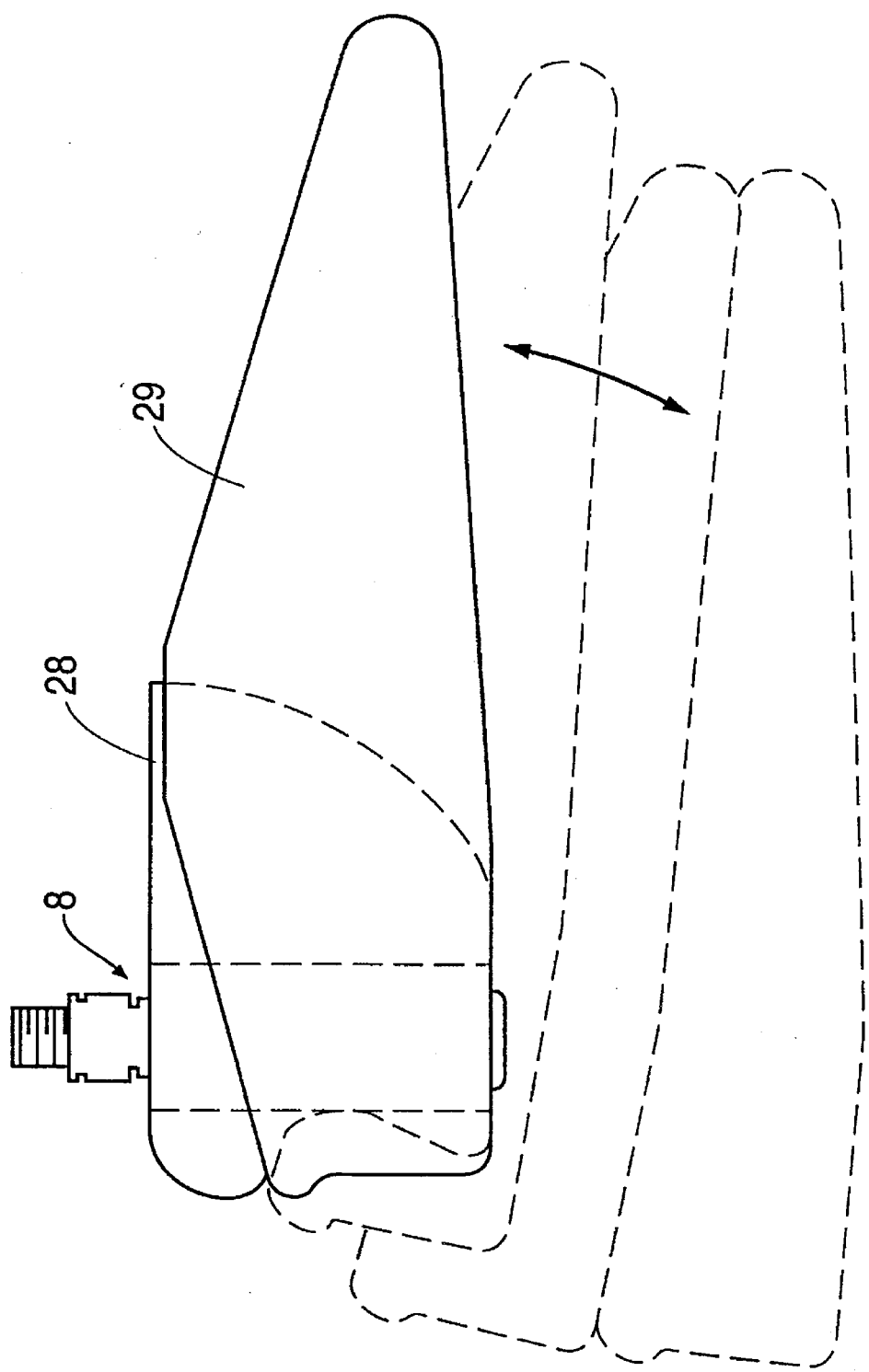

BICYCLE PEDAL

BACKGROUND OF THE INVENTION

The present invention relates to a bicycle pedal assembly of a type which makes bicycling more effective by providing improved possibilities for pulling during the upward phase of a pedal revolution. At the same time provisions can be made so that the foot of the bicyclist is not clamped in such a manner that it is difficult to be released when it is required in a special situation.

There are known numerous previous pedal devices constructed in order to ease and increase the efficiency of the work/movements which a bicyclist has to do. It is self-evident that many such devices often will operate poorly or reverse to the desired effect, since the basic physical work to be executed, cannot be reduced, neither in theory nor in practice. Therefore, a number of such inventions will rather have a negative effect by adding to the bicycle an extra mass (weight) to be carried along, as well as additional friction without any particularly favorable effect to be detected.

However, measures of a sensible character will usually have one of two possible goals, i.e. either (a) providing a different "gear ratio", or (b) providing improved ergonomics.

The two items (a) and (b) may of course also merge into each other, in the sense that the idea of changing a gear ratio, for example by extending a moment arm (which lowers the force requirements, i.e. the requirements for muscular strength, but imposes a longer travel or path for the movement), often will be caused by ergonomic considerations.

However, finding a favorable manner of moving, e.g. so that larger or more muscle groups can be put into action, or so that a "narrow" movement can be changed to a more "free", "open" or unstrained movement, clearly has its own value, independent of moment arm extensions or gear ratios.

As is well known, a quite ordinary bicycle pedal only provides the possibility for downwardly directed force influence from a foot, i.e. in the downward phase, and the two pedals will then operate in an alternating mode, with a resting phase in the upward motion. The classical "racing" pedal is also well known, with a so-called "spurt cleat" and a toe clip with a strap, for strong fixing of the foot to the pedal. Thereby, a possibility also is provided for a pulling action by the foot in the upward phase, but it is not quite certain that the upward pulling possibility provided by the classical racing device gives the best possible ergonomics for the legs/feet in the upward pulling phase. Also, in special situations it is clearly unfortunate that the feet are fixed solidly to the bicycle. Quite a few bicyclists have tipped over because they have not been able to release the toe straps and pull their feet out quickly enough.

More modern variants of such racing pedals have been constructed, which operate without toe clip and strap, but these variants provide substantially the same movement mode, and anyhow, these variants also require a certain technique for release. An example of such a more recent pedal variant is indicated in EP application No. 169,080, which shows a spurt cleat arrangement with a catch feature which can be used both with and without a traditional toe clip.

More particularly it must be mentioned, for an illumination of the art prior to the present invention, that some devices have been conceived to connect the heel part of the foot more directly to the pedal. For example, GB 485,748 shows a device intended to operate partly as a heel rest, partly to provide a possibility for pulling upwardly. However, this device is only an extra equipment to be mounted on an ordinary pedal, and it provides rather limited possibilities for pulling upwardly due to a rather loose hold of the foot with only a bow up behind the heel. The pedal axle means is quite traditional.

Also DE Offenlegungsschrift no. 3,445,043 shows a "heel catch" arranged to provide a possibility for pulling upwardly, and the principle in this case is rather similar to the one mentioned above, with a bow or catch laid around the heel some distance up on the foot. The how is shown schematically attached to an ordinary pedal, presumably with a fixed connection. In reality this device will operate in approximately the same manner as the already mentioned classical "racing" principle, where a corresponding transfer of force from the heel to an ordinary pedal takes place via a tight-fitting shoe with a very stiff sole, which sole is strapped tight to the pedal by means of spurt cleat and strap. However, in DE 3,445,043 no such fixing or strapping appears, and it seems that the ergonomics in this case actually is poorer than in the classical racing case, since the forward part of the foot is loose, providing a more unfavorable use of muscles in the upward pulling phase than the fixed connection of the racing pedal. DE 3,445,043 will be regarded as the prior art most closely connected with the present invention, due to the heel upstroke provision shown.

Another type of holding a shoe heel is shown in DE 62,131, where a shoe heel with a hole and a recess is used, into which a tip and a spring at the end of a rearwardly protruding rail from the pedal may enter. However, this equipment which also is an extra equipment, is primarily intended to hold the foot in place on the pedal, and can hardly be intended to provide the option of pulling upwards at all, since the connection to the heel is mechanically weak. The pedal axle means is of the ordinary type.

One special pedal of a relatively long and integral design is known from DE patent no. 3,149,345. The length of the pedal is approximately half the length of a foot, and the pedal axle means is placed approximately in the middle. The point of this new "racing" pedal, which is intended for use together with bicycling shoes with a specially constructed, rigid mounting pate with engagement details, mounted on the shoe underside, is to provide a "safety pedal" for quick release by twisting sideways. The pedal axle means is of the traditional type, and it also seems somewhat unfortunate when considering the downward pushing phase, that the toeball part of the foot is located far in front of the axle means. The shoe will hardly be particularly suited for walking. The upward pulling phase can be used, however, with a mode of movement which supposedly is not very favorable, probably also in this case less favorable than the classical "racing" pedal.

From FR 989,397, FR 796,362 and CH 540,812 are known pedal systems for providing moment arm extension means for the pedal arm in the downstroke, by means of freewheel devices in the pedal axle. In these cases the foot toeball part must be placed forward of the pedal axle to achieve the intended effect. Ergonomics will not be substantially altered in such cases, mostly only a forward shift of the foot movement circle (which results in a necessary change of sitting position), together with a long forward pedal arm (which gives the same effect as a lower gear ratio).

SUMMARY OF THE INVENTION

The purpose of the present invention is to provide a pedal which given an efficient and economically favorable upward pulling motion.

The above purpose is achieved by means of a bicycle pedal assembly of the type without the need of shoes which cannot be used for walking, and which pedal assembly gives the option of quick release. The pedal assembly includes a pedal on a pedal axle and having a length extending beneath substantially the entire foot of a cyclist. The pedal includes a portion to support the ball of the foot of the cyclist, such portion being positioned substantially directly above the pedal axle. The pedal has at a rear end thereof a heel attaching structure to achieve attachment of the rear end of the pedal to the heel of the foot of cyclist. A free wheel device is mounted between the pedal and the pedal axle and enables free rotation of the pedal relative to the pedal axle in a direction opposite to a direction of drive rotation of the pedal assembly, and blocks rotation of the pedal relative to the pedal in a direction corresponding to the direction of drive rotation.

BRIEF DESCRIPTION OF THE DRAWINGS

The invention shall now be further described by referring to the enclosed drawings, which show embodiments of the invention, and where:

FIGS. 1a and 1b are a plan view and a longitudinal section of an embodiment of a pedal assembly in accordance with the invention, FIGS. 2a and 2b are views respectively from the side and in perspective of a pedal assembly of another embodiment in accordance with the invention, FIG. 6 is an elevation view of another variant of the invention, intended for use in track bicycling;

FIG. 7 is a bottom view of a two-part assembly in accordance with another embodiment of the invention.

DETAILED DESCRIPTION OF THE INVENTION

FIGS. 1a and 1b show an example of a bicycle pedal 1 in accordance with the invention. The central and vital feature of the pedal is the construction of a pedal axle means 8, which is of a special type in connection with pedals.

Figure 3A:
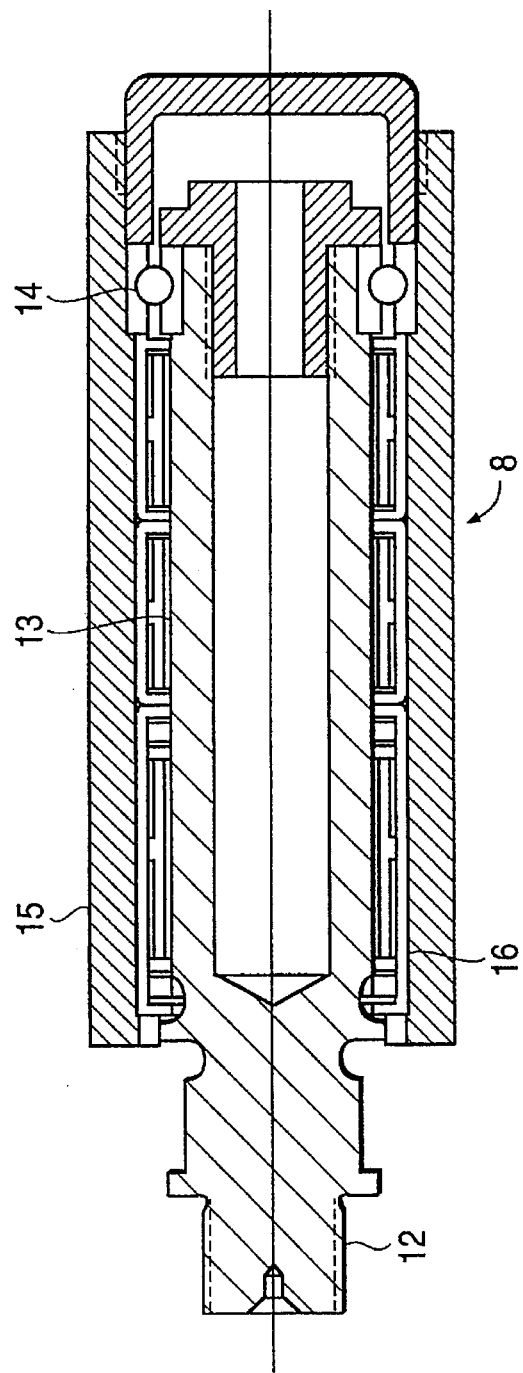
FIGS. 3a and 3b are a longitudinal section and a perspective view of a pedal axle.
Figure 3B:
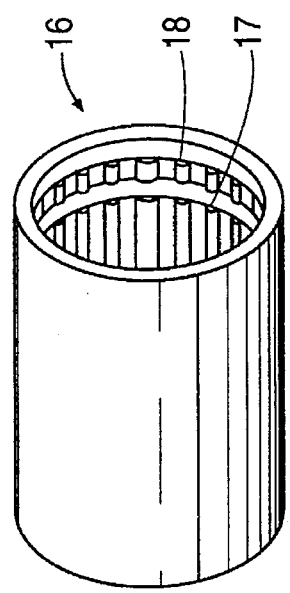

As appears in closer detail from FIGS. 3a and 3b, the pedal axle means 8 comprises a freewheel 16 which makes the pedal rotate freely in one rotation direction, while rotation in the other direction is blocked. The freewheel is mounted in such a manner that the free rotation direction is opposite to the rotation direction of the pedal arms when pedalling the bicycle in a forward direction, and hence in such a manner that the freewheel blocks rotation of the pedal relative to the axle when one attempts to rotate the pedal in the same direction as the rotation of the pedal arm.

The pedal 1 shown in FIGS. 1a and 1b comprises also a main part 2 which is relatively long and slim in one direction relative to axle means 8 and has a shorter and more massive forward part 9 in the opposite direction as viewed from the axle means 8. On the top thereof, the pedal is substantially flat and designed with a down pedalling section 7 located substantially directly above the pedal axle means 8. As appears from FIGS. 2a and 2b, the foot of the bicyclist shall be placed upon the pedal 1 in such a manner that the ball of the foot is located substantially upon the down pedalling section 7 just above the axle means 8, and in such a manner that the heel is located above the outer end of the elongated main part 2. In this manner a forward direction and a rearward direction is defined for the pedal 1, so that the long part of the main part 2 points rearwardly. In the rearward end of main part 2 there is a heel attaching means 3. In the example shown in FIGS. 1a and 1b, the heel attaching means 3 comprises a substantially hook-shaped attaching lip or attaching pin or projection 6 adjustably fixed by means of screws 4 and a groove 5 to the rearward end of the pedal main part 2.

As appears from FIGS. 2a and 2b, which show a somewhat simpler version of the pedal in accordance with the invention, i.e. without the option of adjustment of the attaching pin 6, a shoe with an adapted hole 11 in the shoe heel is used to provide engagement with the attaching pin 6 by moving the shoe 10 rearwardly along the pedal. The length of the pedal is adapted in such a manner that when the attaching ping 6 engages the hole 11, the toeball part lies substantially right above the pedal axle means 8 and on the down pedalling section 7. The foot of the bicyclist can be released very easily from this position, simply by pulling the foot in a forward direction again.

The heel attaching means shown in FIGS. 1a–2b are constructed to provide engagement with a specially designed shoe 10, which however, also can be designed in such a manner that it is well adapted for walking, i.e. without unpleasant cleats or similar details on the underside. However, it must already at this point be noted that heel attaching means can be constructed in a number of other manners without deviating from the scope of the present invention. For example, a hole similar to hole 11 of FIGS. 1a and 2b can be provided in the forward end of an ordinary shoe heel, to cooperate with a rearwardly directed pin standing up in a suitable position on top of the pedal. In principle it will not even be necessary to provide a specially designed shoe, since a heel attaching means can be constructed in such a manner that it grips around a heel/shoe, independent of the shoe shape. However, the heel attaching means in accordance with FIGS. 1a–2b are particularly simple and provide a good grip. The shoe itself must however, fit well to the foot in the heel area to avoid that the heel slips out of the shoe when pulling upwardly.

Already at this point it seems justified to look closer at the mode of operation of the pedal. The gist of the present pedal can substantially be found in the upward pulling phase of a pedal revolution. In the down pedalling phase the pedal operates per se like an ordinary pedal. Force is transmitted through the down pedalling section 7 to the axle means 8 which rotates in a completely normal manner, and the heel attaching means 3 acts in this phase substantially merely to hold the foot steadily in its place.

In the upward pull phase it is now possible to use an upwardly directed force, even though the toeball part just lies loosely upon the down pedalling section 7. The force is now applied through the heel attaching means 3, and this feature is enabled because the freewheel of axle means 8 blocks rotation in the direction which would result from the heel pulling action. At the same time one achieves that the pedal arm is effectively extended, which means that the pedal in reality becomes a moment arm extension means during the upward pull phase. The movement to be executed by the leg of the bicyclist in the upward pull phase will also be a different and more favorable movement than the movement executed when the traditional "racing" pedal system is used, just because the freewheel in axle means 8 blocks in such a manner that the cooperation between heel and toeball part becomes quite something else in the upward pulling phase. Experiments seem to indicate that the ergonomics is better than when using previously known pedal systems.

When a bicycle ride has been ended and the shoe 10 is removed from the pedal 1, the long, rearwardly protruding part of the pedal would tend to swing down (due to a free rotation in that direction) and cause problems when hitting the ground. Therefore, the pedal is constructed with a balancing of masses in such a manner that the forward part 9 has a larger torque about the pedal axle than the slim, rearwardly protruding part, i.e. the forward part 9 comprises a substantially larger mass. Thus, the pedal will tend to rotate in the same direction as the pedal arms in a driving phase, however this rotation is immediately stopped by the freewheel in the axle means. Therefore, the pedal will come to a standstill in an approximately horizontal position when the foot leaves the pedal.

Even if forward part 9 of the pedal is constructed with a larger mass than the rest of the pedal, one will of course attempt to construct the complete pedal to be as low-weight as possible, however, with due consideration to the forces to be transmitted. As appears from the drawings, it is possible to provide a pedal construction which is rather integrally shaped, but the final design will be variable within wide limits, e.g. depending on choice of materials. Steel, aluminum and hard plastics are topical materials, however the invention is not limited in this respect.

FIGS. 3a and 3b show the pedal axle means 8 in closer detail. At the left in FIG. 3a appears a threaded pedal fixing bolt 12 for mounting the pedal to the pedal arm. Reference numeral 13 indicates the axle center spindle which is integral with the threaded pedal fixing bolt 12, and the outer sheath of the axle means, which outer sheath is integral with or fixed in relation to the pedal itself, is the pedal housing 15. The pedal housing 15 is supported freely rotatably on center spindle 13 via an outer ball bearing 14 and direction-dependently rotatably via freewheel 16 which preferably is located innermost on the axle means 8. Existing freewheels of types which are well adapted for this purpose, for instance a Swedish manufactured freewheel of the brand INA, have been used in experiments. Such a freewheel is shown relatively schematically in FIG. 3b, and includes a metal outer ring with a thin wall, on the inside thereof being equipped with clamping surfaces and a plastic retaining means with metal springs mounted therein. Such retaining means ensures exact guidance and positioning of needle rollers 17 which operate as clamping organs. These needle rollers 17 move radially depending on the freewheel rotation direction, so that in one rotation direction the needle rollers 17 will move in toward the center spindle and block rotation. The outside of freewheel 16 is fixed to pedal housing 15. When trying to rotate in the opposite direction, the needle rollers 17 will move outwardly in a radial direction, and free rotation is obtained, so that pedal housing 15 is able to rotate around center spindle 13. Freewheel 16 also comprises side rollers 18 which are not able to move in a radial direction, but serve for guidance and support and for receiving radial forces during a free rotation.

Figure 4:
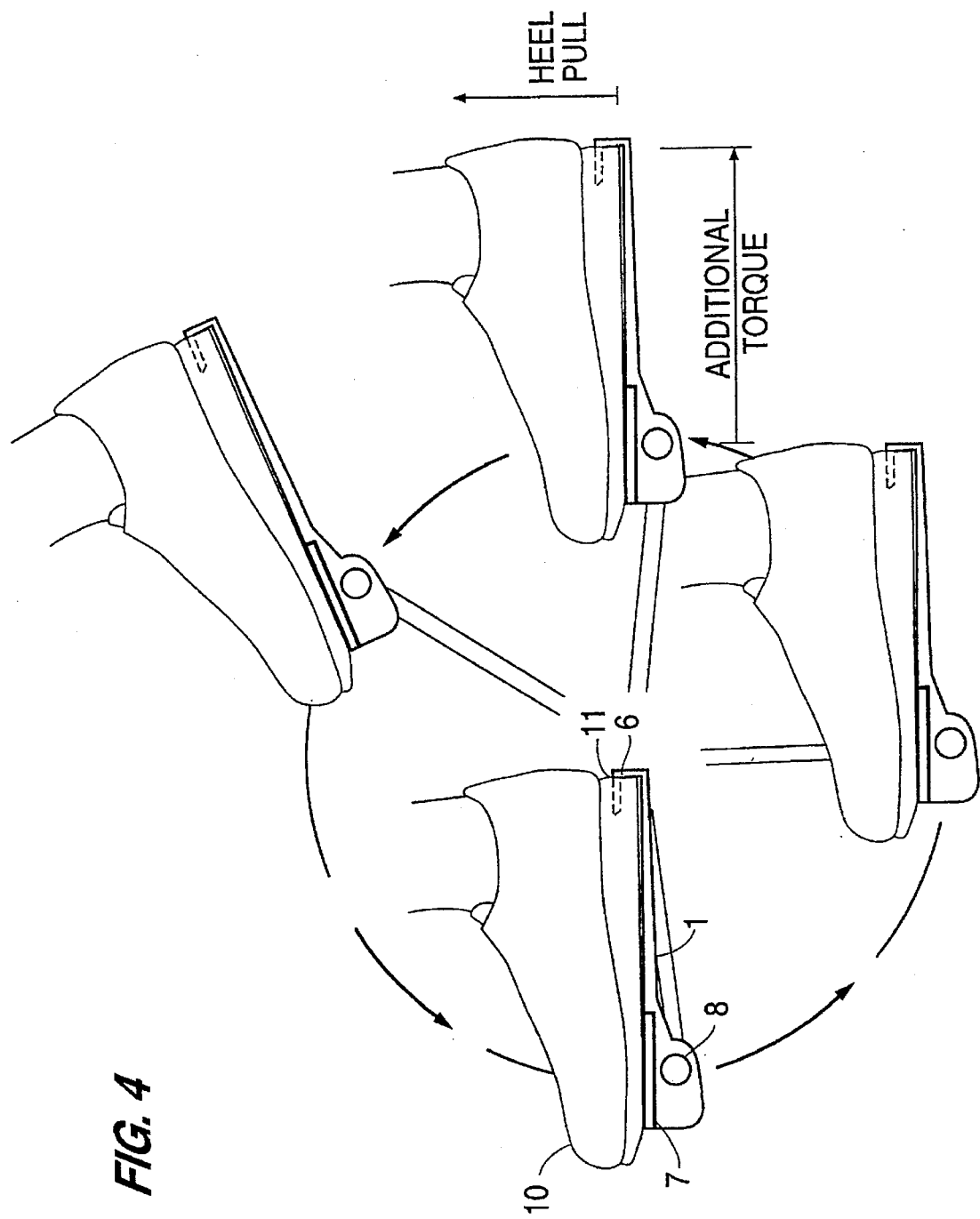
FIG. 4 is a schematic view showing different phases of a push/pull period of movement with a pedal assembly in accordance with the invention.

FIG. 4 shows schematically four phases of a cycle or period of pedal rotation. To the left appears the down pedalling phase, where, as previously mentioned, a per se ordinary pedalling operation is executed. When the pedal arm points directly down, i.e. in the traditional "dead phase", the pedal in accordance with the invention will provide a possibility for continued transfer of force by a rearwardly directed movement of the foot. In this phase the pedal in accordance with the invention does not differ must from, e.g., the traditional "racing" principle.

However, in the next shown phase, i.e. in the upward phase to the right in the drawing, an option is provided which has not previously existed. Due to the freewheel blocking of rotation, the long pedal will work as a moment arm extension means, and thereby provide a completely different mode of movement for the leg in the upward pulling phase, than the classic "racing" principle. The classic movement rather becomes a pulling action down through a foot which points downwardly, which movement is sensed as a somewhat forced or convulsive movement, while the present invention provides the option of a more "open" use of muscles by the feature that the foot can be held in an approximately horizontal position up through a substantial part of the upward pulling phase.

Figure 5A:
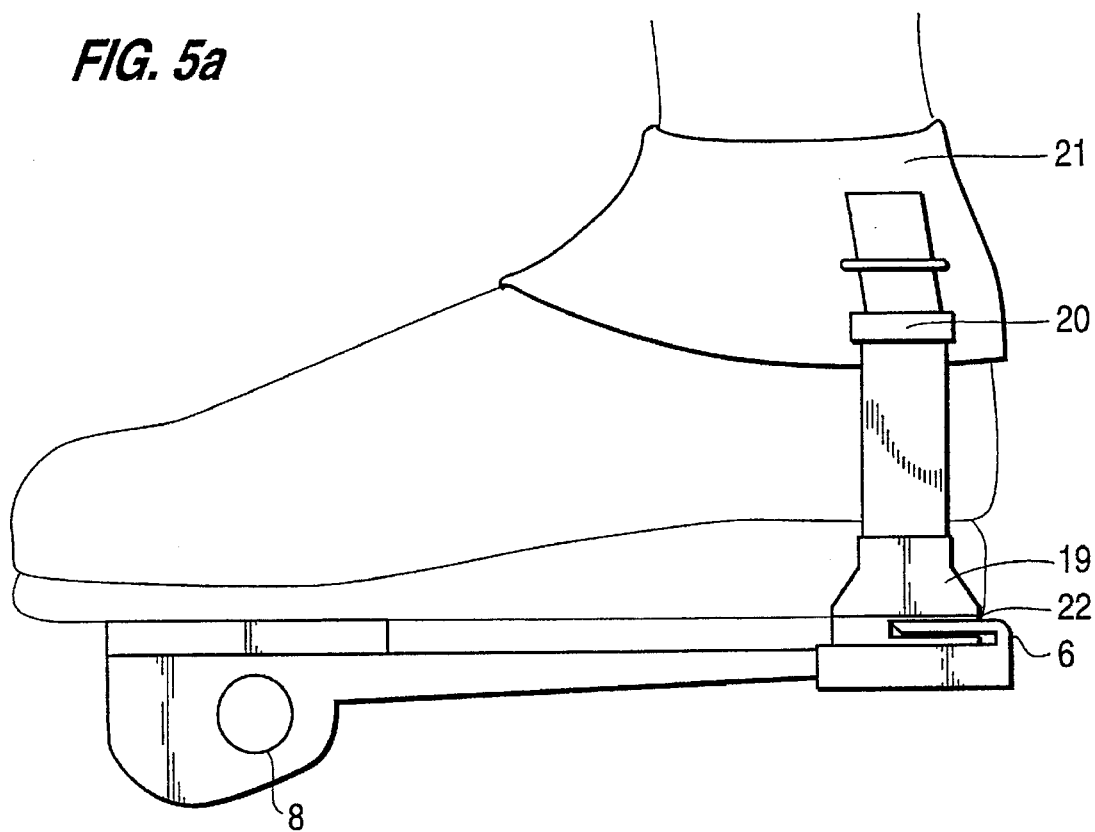
FIGS. 5a and 5b are an elevation view and a perspective view similar to FIGS. 2a and 2b, but of another embodiment of a pedal/shoe assembly in accordance with the invention.
Figure 5B:
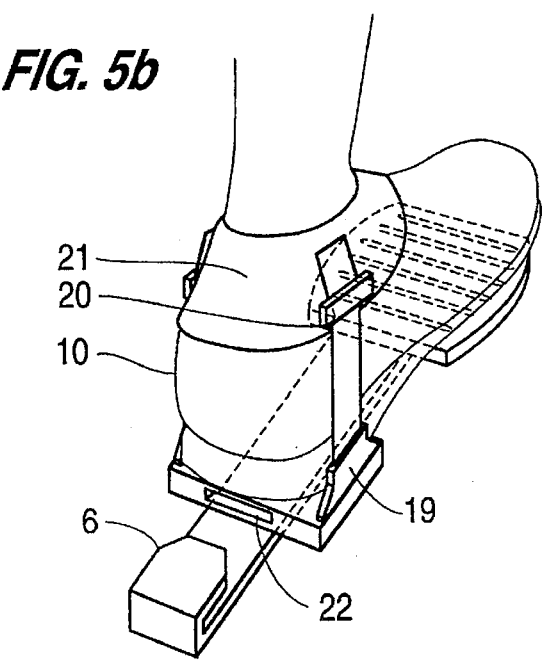

In FIGS. 5a and 5b appears an alternative design of a heel attaching means. On this pedal there is in the rear end also in this case an attaching lip 6 of substantially the same type as previously mentioned, however, here a special device is strapped onto the foot to provide an attachment possibility independent of the shoe type, i.e. any type of shoe can be used. An attachment gaiter or cuff 21 is placed around the ankle part above the foot, and an attachment block 19 is fixed to the gaiter 21 by means of straps 20. A slide groove 22 in the attachment block 19 is adapted to provide attachment when the attaching lip 6 moves into engagement therewith, in a manner similar to the previously mentioned case. Such an attaching means can be designed in such a manner that it can be tilted away quite simply when a person wants to get off the bicycle and start walking.

Even though one of the reasons behind the invention is that it is desirable to be able to be released from the bicycle easily in difficult situations, the principle of using a freewheel in the pedal axle means suggests constructing a particularly suitable type of pedals for extreme rapid bicycling, i.e. competition bicycling on a track. Pedals of the type where bicycling shoes are integrated with the pedal itself, are previously known, but in the previously known cases, the pedal axle means is of a traditional type with free rotation in both directions. With such an integrated shoe/pedal, but where a freewheel of the type mentioned here is used, it will be possible to achieve a further improvement of the upward pulling phase, using the same principle as mentioned above. FIG. 6 shows schematically such a pedal which is designed as integrated with a shoe 23, where a base part comprises the pedal axle means 8 with a freewheel, and where the heel attaching means quite simply is a shoe heel cap 25, which is designed with a good and tight fit around the foot. A balancing of the previously mentioned type is possibly provided also in this case by means of a more massive forward part 9. The shoe part 23 and the sole or base part can either be undetachably fixed to each other by welding, gluing or similar means, or screw connections 26 may be used in order that adaptation of shoe size can be done in a simpler manner.

The new principle of having a freewheel in the pedal axle means may provide a substantially improved upward pedal pull than previously known solutions, and may therefore provide a clear advantage in competition situations. Of course, in this case one renounces the possibility of being able to release oneself quickly from the bicycle, since such an option is rather uninteresting in this mode of bicycling, particularly when compared to the possibility of being able to bicycle faster.

Figure 8A:
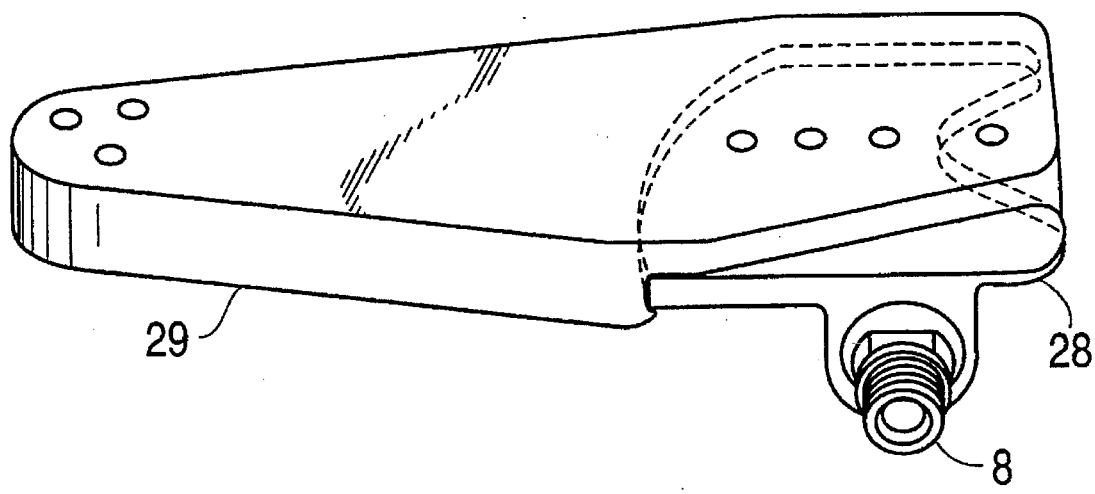
FIGS. 8a and 8b are perspective views illustrating the two-part assembly connected and released, respectively.
Figure 8B:
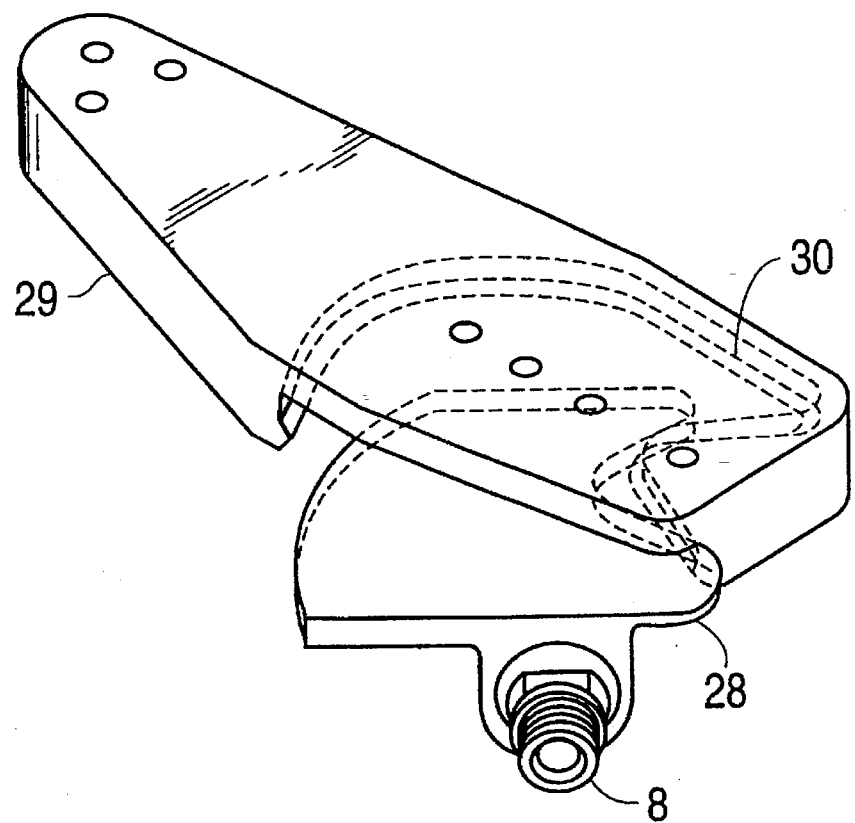

A construction which is favorable regarding use, and which lies within the scope of the invention, is a two-part embodiment of the elongated main part. Such an embodiment is shown in FIGS. 7, 8a and 8b, where the pedal is shown from the underside in FIG. 7, from the side during use in FIG. 8a, and in a de-mounted state in FIG. 8b. The foot is in this case attached, in the heel area, to a top pedalling/pulling part 29 of the pedal main part, and this top pedalling/pulling part can be locked fixedly to a bottom axle part 28 by means of a bayonet catch in order to constitute a footlength, integral and rigid main part during use while the pedal is two-part when not in use. The axle part 28 comprises the special freewheel axle means 8. As appears from FIG. 7, where the pedal is viewed from the underside, it is possible to wriggle loose the top pedalling/pulling part 29 by a twist in the direction shown by an arrow. The pedalling/pulling art 29 will then follow the foot and be released from the axle part 28. In a corresponding manner the pedalling/pulling part 29 (which has already been attached on the underside of the foot) is fixed to the axle part 28 by an oppositely directed twisting movement of the heel, until the bayonet catch grips and provides a rigidly connected pedal unit. Reference numeral 30 shows the groove for the bayonet catch in the pedalling/pulling part.

Figure 9:
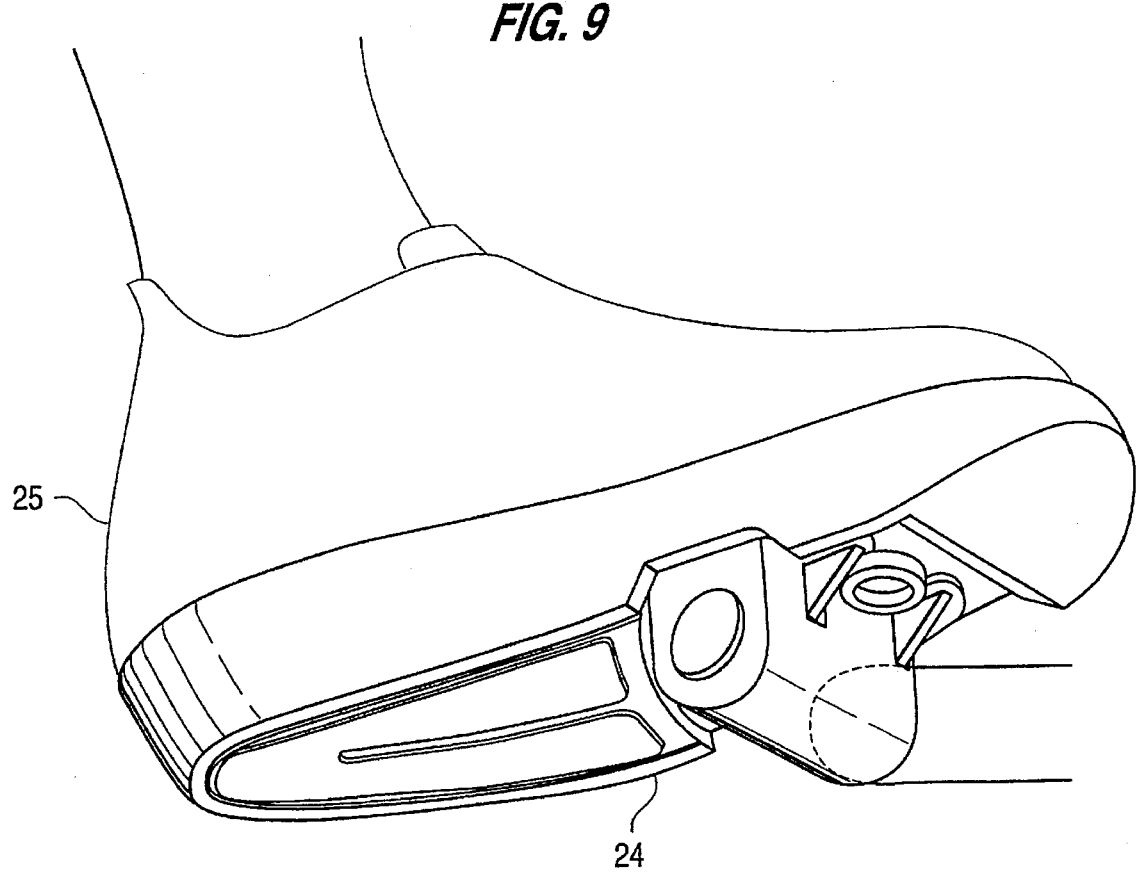
FIG. 9 is a perspective view of an embodiment of an assembly incorporating the features of FIGS. 6 and 7.

Of course it will also in this case be possible to construct the pedalling/pulling part 29 as a lower part of a shoe, in analogy with the competition type pedal mentioned above. Such an embodiment is shown in FIG. 9.

I claim:

1. A bicycle pedal assembly comprising:

a pedal axle to be fixed to a bicycle crank arm and to be rotated by a foot of a cyclist in a direction of drive rotation;

a pedal on said pedal axle and having a length to extend beneath substantially the entire foot of the cyclist, said pedal including a portion to support the ball of the foot of the cyclist, said portion being positioned substantially directly above said pedal axle, and said pedal having at a rear end thereof a heel pulling means to achieve pulling attachment of said rear end of said pedal to the heel of the foot of the cyclist enabling the cyclist to pull said rear end upwardly;

a freewheel device disposed between said pedal and said pedal axle and enabling free rotation of said pedal relative to said pedal axle in a direction opposite to said direction of drive rotation while blocking rotation of said pedal relative to said pedal axle in a direction corresponding to said direction of drive rotation;

whereby during a forward down pedalling phase said pedal rotates freely relative to said pedal axle in said direction opposite to said direction of drive rotation; and said freewheel device and said heel pulling means together defining means for, only during a forward up pedalling phase during which the heel of the foot of the cyclist attempts to rotate said pedal relative to said pedal axle in said direction corresponding to said direction of drive rotation, blocking such attempted rotation and thereby forming a moment arm extension resulting in an increased upward pulling force during the forward up pedalling phase.

2. An assembly as claimed in claim 1, wherein said heel pulling means is easily attachable to and detachable from a shoe to be worn by the cyclist.

3. An assembly as claimed in claim 1, wherein said heel pulling means comprises a rearwardly extending projection on said pedal and to fit into a slot formed in the front of a heel of a shoe to be worn by the cyclist.

4. An assembly as claimed in claim 1, wherein said pedal has a mass forwardly of said pedal axle greater than a mass of said pedal rearwardly of said pedal axle.

5. An assembly as claimed in claim 1, wherein said pedal comprises a shoe to be worn by the cyclist, said ball support portion comprising a forward part of a sole of said shoe, and said heel pulling means comprising a heel of said shoe to fit tightly around the heel of the foot of the cyclist.

6. An assembly as claimed in claim 1, wherein said pedal comprises an undersole attached to a shoe to be worn by the cyclist.

7. An assembly as claimed in claim 1, wherein said pedal comprises a one-piece elongated member.

8. An assembly as claimed in claim 1, wherein said pedal comprises a two-part construction including an axle part supporting said pedal axle and said freewheel device, and a pedalling part releasably connected to said axle part and including said ball support portion and said heel pulling means.

9. An assembly as claimed in claim 8, wherein said pedalling part is connected to said axle part by an engagement and locking device on said pedalling part engaging a complementary device on said axle part and being releasable therefrom by a sideways twisting motion imported to said pedalling part by the foot of the cyclist.

10. An assembly as claimed in claim 9, wherein said pedal further comprises a shoe to be worn by the cyclist, said shoe being attached to said pedalling part, said ball support portion comprising a forward part of a sole of said shoe, and said heel pulling means comprising a heel of said shoe to fit tightly around the heel of the foot of the cyclist.

11. An assembly as claimed in claim 1, wherein said heel pulling means comprises a forwardly extending projection.

12. An assembly as claimed in claim 11, wherein said projection fits into a slot formed in the rear of a heel of a shoe to be worn by the cyclist.

13. An assembly as claimed in claim 11, wherein said projection fits into a slot on a block to be attached to a shoe of the cyclist.

14. An assembly as claimed in claim 11, wherein the position of said projection forwardly and rearwardly of said pedal is adjustable.

* * * * *